Nov. 16, 1926.  
G. T. SMITH-CLARKE  
1,606,966  
MOUNTING FOR PARTS ON MOTOR VEHICLES  
Filed Jan. 4, 1926
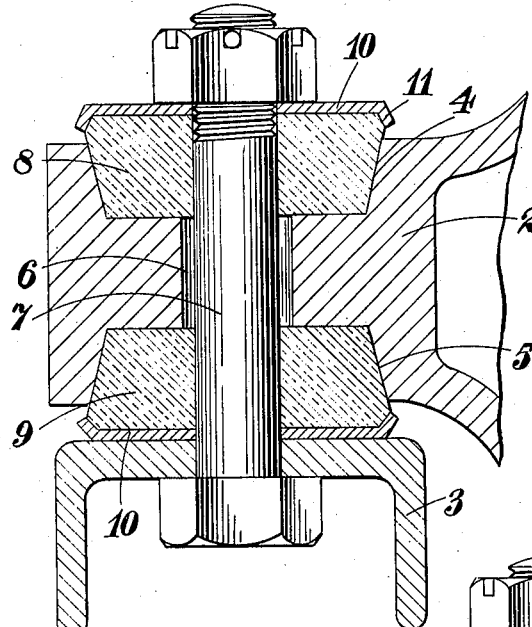
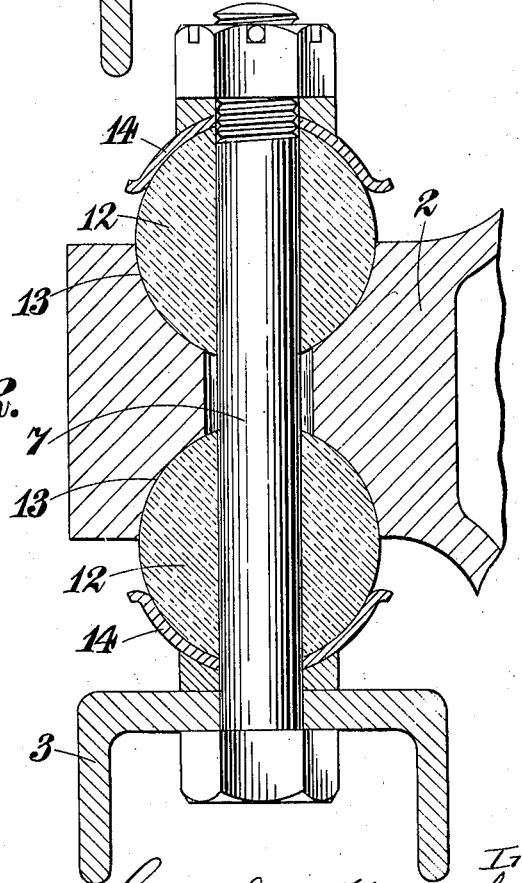
Inventor  
George Thomas Smith-Clarke Patented Nov. 16, 1926.

1,606,966

UNITED STATES PATENT OFFICE.

GEORGE THOMAS SMITH-CLARKE, OF KENILWORTH, ENGLAND.

MOUNTING FOR PARTS ON MOTOR VEHICLES.

Application filed January 4, 1926, Serial No. 79,184, and in Great Britain March 11, 1925.

This invention relates to the mountings of engines or gear boxes, preferably for use on motor vehicles, and it relates to that type of mounting wherein there is interposed between an attachment device such as an arm, bracket, or the like, on the engine or gear box and a supporting member such as the chassis frame, a pad of rubber.

The object of the present invention is to provide a durable mounting of this kind which will be very efficient in insulating the engine or gear box from the frame and in reducing noise and vibration.

According to this invention, the pad or block of rubber is gripped between and fits closely within oppositely arranged recesses carried by the attachment device and the supporting member respectively.

In the accompanying drawings,

Figure 1 is a section through part of a upporting arm, showing one method of carrying this upon an element of a motor vehicle frame, and Figure 2 is a similar view showing a modification.

Like numerals indicate like parts throughout the drawings.

In the arrangement shown in Figure 1, the engine or gear box is provided with an attachment device such as an arm or bracket 2 which is adapted to be mounted upon a supporting member 3 on the vehicle frame, the arm usually resting upon this member and being bolted to it, either directly, or, in some cases, with an intermediate strip of rubber, or other resilient packing between the arm and the frame member.

In applying the present invention, the arm is formed on its upper face with a recess 4 and below with a recess 5, these recesses tapering as shown. The arm is bored at 6 to receive the bolt 7 whereby it is secured to the frame, and upon this bolt, above and below the arm, are rubber blocks 8 and 9 which are coned to correspond to the shape of the recesses and are backed up by recessed washers 10 upon the bolt.

An important feature of the invention is that the rubber blocks 8 and 9 are slightly larger in diameter than the recesses 4 and 5, so that they have to be forced by means of the bolt into the recesses. The result is that the rubber is compressed in every direction, which is aided by the fact that the washers 10 are recessed through being flanged at 11.

In the modification shown in Figure 2, the rubber blocks 12 are spherical, the recesses 13 in the arm and the washers 14 are of corresponding shape. In this arrangement also the rubber blocks are slightly larger than the recesses so that they will not bottom fully in the recesses until the nut on the bolt 7 has been considerably tightened, so that the rubber blocks are then under compression in all directions.

By this means very long life is imparted to the rubber blocks and an efficient insulation of the engine or gear box from the frame is obtained, which absorbs vibration, reduces gear and other noises, and also, in the case of an engine mounting, tends to prevent the transmission to the frame of engine torque vibrations.

What I claim as my invention and desire to secure by Letters Patent of the United States is:—

1. In a resilient mounting for parts on motor vehicles the combination of a vehicle frame member, a recessed washer thereon, a rubber block in said recess, an arm resting on said rubber block, a recess for said block in said arm, an upper recess on the upper face of said arm, an upper rubber block in said recess, a recessed upper washer resting on said upper rubber block and a bolt drawing said upper washer down towards said frame.

2. The device of claim 1, said rubber blocks being under compression in said recesses in all directions.

In testimony whereof I have signed my name to this specification.

GEORGE THOMAS SMITH-CLARKE.